June 25, 1929.  Z. LITTMAN  1,718,697
DETACHABLE WHEEL RIM
Filed July 16, 1924  2 Sheets-Sheet 1
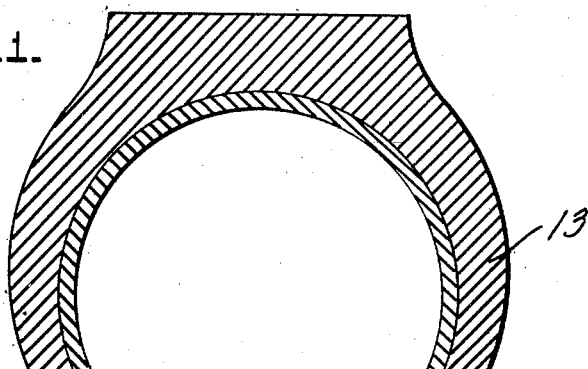
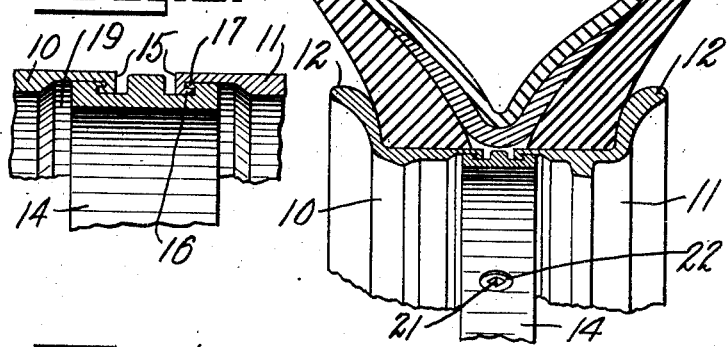
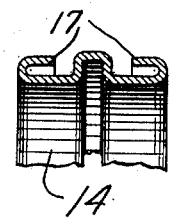
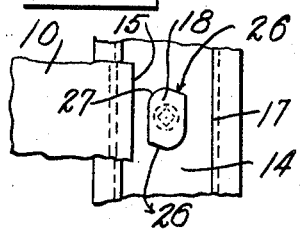
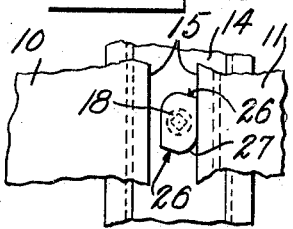
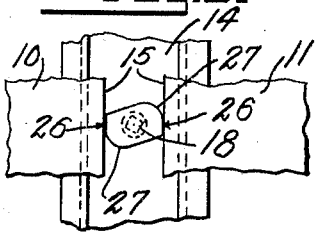
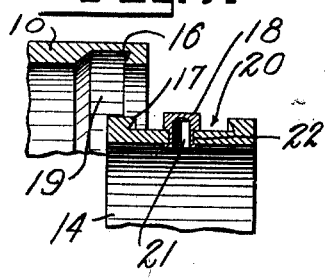
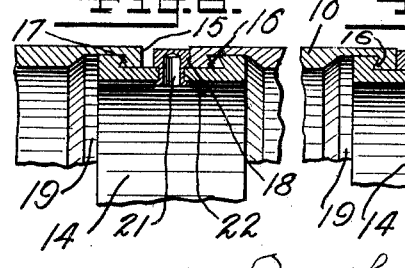
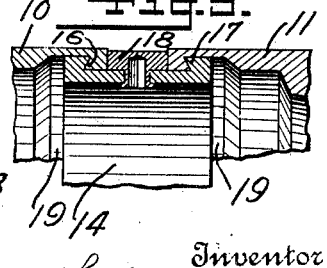
Inventor
Zeno Littman
By his Attorney June 25, 1929.  Z. LITTMAN  1,718,697
DETACHABLE WHEEL RIM
Filed July 16, 1924  2 Sheets-Sheet 2
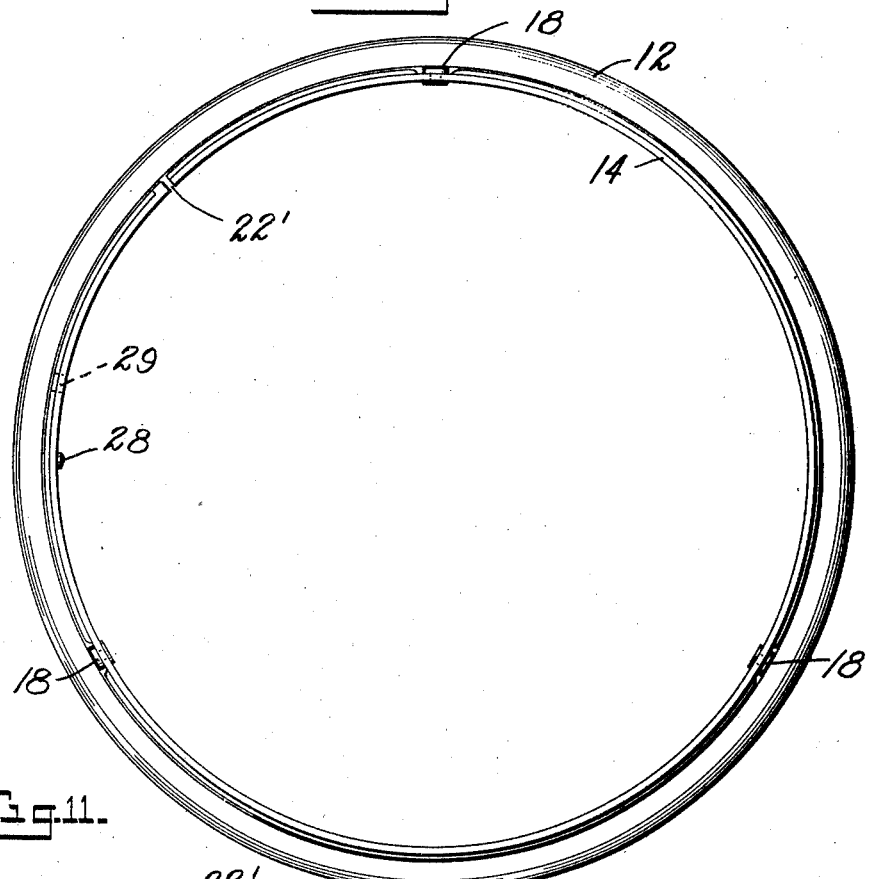
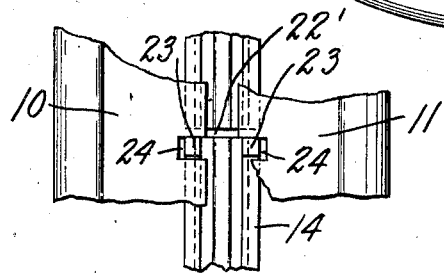
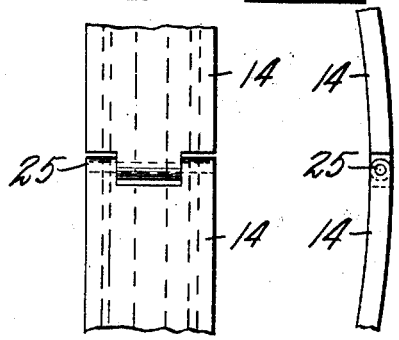
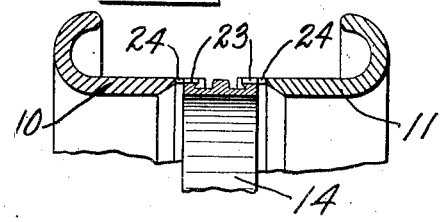
Inventor
Zeno Littman
By his Attorney Patented June 25, 1929.

1,718,697

UNITED STATES PATENT OFFICE.

ZENO LITTMAN, OF NEW YORK, N. Y.

DETACHABLE WHEEL RIM.

Application filed July 16, 1924. Serial No. 726,260.

This invention relates to tire-supporting rims for vehicle wheels, and more particularly to demountable rims of the sectional, circumferentially divided type.

Broadly, the object of the invention is to provide a demountable rim of the general type referred to which can be readily disassembled, and in which a coupling device for the rim members is provided that exerts a locking or holding action whose effectiveness is increased in proportion to the strain or load exerted on the parts in the operation of the vehicle supported thereby.

The invention includes two annular tire-supporting members having their inner edges formed for interlocking engagement, with a coupling member, for securing them together. For the effective interlocking and holding of the interengaged parts, the coupling member is provided with inwardly directed flanges or shoulders formed to be engaged by corresponding outwardly extending shoulders formed on the tire-supporting members, the interengaging shoulders being held in locking contact by manually operable cam members suitably disposed for the purpose. Preferably the locking cam members are mounted on the coupling member, and are operable to force apart the contiguous edges of the tire-supporting members so as to force the shoulders on the tire supporting members into interlocked engagement with the shoulders on the coupling member.

Other features of the invention will be hereinafter referred to.

In the drawings, in which a number of embodiments of the invention have been selected for illustration, Figure 1 is a detail view showing in section a portion of a demountable rim embodying the invention, and with a tire mounted thereon;

Figure 2 is a sectional view of an enlarged detail, showing a modified embodiment of the invention;

Figure 3 is a view similar to Figure 2, showing a modified form of coupling member forming part of the invention;

Figures 4, 5 and 6 are plan views showing different steps in the operation of assembling the parts of the device shown in Figure 1 of the drawing;

Figures 7, 8 and 9 are sectional views, respectively, of the parts shown in Figures 4, 5 and 6 of the drawing;

Figure 10 is a view in side elevation of the demountable rim shown in section in Figure 1;

Figure 11 is a plan view on an enlarged scale of a detail of the invention showing means for locking the parts against relative circumferential movement;

Figure 12 is a sectional view of the parts shown in Figure 11;

Figure 13 is an enlarged view of a detail showing a hinge joint that may form part of the coupling ring shown in Figure 10;

Figure 14 is a side view of the parts shown in Figure 13.

Referring to the drawings for a more detailed description of the invention, at 10 and 11 are shown complementary annular tire-supporting members having outstanding flange members 12 which assist in providing a seat for a tire 13 shown in Figure 1 of the drawing. The members 10 and 11 are held in their tire-supporting position by means of a coupling member 14, which engages the tire-supporting members at their inner edges and forms an interlocked connection therewith to provide a rigid tire-supporting structure when the parts are in assembled condition.

In order to bring about the interlocking engagement of the coupling member 14 with the tire-supporting members 10 and 11, the members 10 and 11 are provided along their inner contiguous edges 15 with outwardly extending shoulders or flanges 16, adapted to engage with similar shoulders or flanges 17 formed on the coupling member 14, the flanges 17 being arranged to extend inwardly so as to interlock with the shoulders 16 on the tire-supporting members, as clearly indicated in Figures 1 and 2 of the drawing. In the particular construction shown in Figure 1 the shoulders or flanges 16 and 17 are formed with undercut inner faces to provide an interlocking connection, as is clearly shown in Figures 7, 8 and 9.

A double-end cam member 18 is rotatably mounted on the locking ring 14, and is formed to engage the confronting edges 15 of the tire-supporting members 10 and 11 and to force the tire-supporting members apart, this action forcing the shoulders 16, carried by the tire-supporting members 10 and 11, into interlocked engagement with the inwardly extending shoulders 17 of the coupling member 14.

In Figures 4 to 9 of the drawing there is illustrated the operation of assembling the tire-supporting members 10 and 11 and the coupling member 14 into a rigid construction adapted to support the tire 13. In Figures 4 to 7 of the drawing is shown the coupling member 14 about to be moved to position to bring the shoulders 17 thereon into the channel 19 formed in the tire-supporting member 10 in the face of the shoulders 16. In Figures 5 and 8 of the drawing the coupling member 14 and the tire-supporting member 10 are shown moved into their interlocked relation and, in addition, the tire-supporting member 11 is shown with the shoulder 16 thereof placed within the channel 20 immediately in front of the shoulder 17 of the coupling member. Following this the cam member 18 is turned to the position indicated in Figures 6 and 9 of the drawing, and the tire-supporting members 10 and 11 forced apart so that the shoulders 16 thereon are moved into position beneath the overhanging shoulders 17 of the coupling member 14. The parts are thus held in locked and rigid relation, so that strains delivered to the rim by way of the tire 13, and which tend to force the tire-supporting members 10 and 11 apart, act to bring about an even more closely interlocked relation of the shoulders 16 and 17.

The operation of the locking cam members 18 is effected by the use of a key member which may be inserted in a keyway 21 provided in a shank 22 formed on the cam member, shank 22 having a journaled seat in the wall of the coupling member 14, and keyway 21 opening inwardly of the coupling ring. It will be seen that with this arrangement the insertion of a key into the keyway 21 from the inside of the coupling member 14 serves to lock or unlock the tire-supporting members 10 and 11 to or from their coupling support.

The coupling member 14 may be formed as a unitary member such as is shown in Figure 10 of the drawing, with a single transverse cut therein such as is indicated at 22′. With this construction the coupling member may be removed by springing one of the ends at the gap 22′ radially inward from its position whereupon the entire coupling member may be withdrawn from its locking position.

In order to prevent relative rotation of the two tire-supporting members 10 and 11, the coupling member 14 may be provided with a pair of outwardly extending lugs 23, adapted to be seated in corresponding recesses 24 formed in the inner edges of the rim members 10 and 11.

The coupling member 14, instead of being formed in a one-piece construction such as is shown in Figure 10 of the drawings, may be formed with hinge joints 25 provided therein, indicated in Figures 13 and 14 of the drawing. With either form of coupling member shown, by a suitable movement of the locking cam members 18, the tire-holding members 10 and 11 can quickly and readily be placed into or removed from tire-supporting assembled relation; and the assembled relation is a rigid one which will become still more secure under the stresses and strains of operation.

In Figures 2 and 3 of the drawing there is shown a modified form of locking-shoulder construction wherein the shoulders have a right-angled interhooking relation instead of the oblique angular faces shown in Figures 1 and 9 of the drawing. This arrangement is exceedingly effective in its holding function. The shoulders may be formed by a cutting operation following a casting operation, to produce the shoulders formed on the coupling ring 14ᵃ such as shown in Figure 2 of the drawing; or the coupling ring may be formed of sheet metal, with the flanges 16 thereon produced in a suitable shaping or forming operation. The type of coupling ring shown in Figure 3 may be very economically produced.

To insure that the locking cam members 18 will remain in their spreading or locking position, they are provided with flat edge-engaging faces 26, which are brought into contact with the confronting edges 15 of the rim members when the cam has been rotated from the position of Figure 5 to that shown in Figure 6 of the drawing. In this movement the rounded cam portions 27 of the locking member 18 are brought into spreading engagement with the edges 15, following which the flat portions 26 engage the rim edges, the flat portions being spaced a slightly less distance from the center of rotation than that of the highest point of the rounded cam portions 27, so that a position of rest is obtained which insures the retention of the locking members 18 in their locking position.

In practice the coupling ring member 14 may be provided with an inwardly extending lug 28 for cooperation with a corresponding recess in the felloe of the wheel to maintain registration of the valve stem opening 29 with the corresponding opening in the felloe member.

I claim:

1. In a demountable rim for vehicle wheels, a pair of complementary annular tire-supporting members in edge-to-edge relation and provided with outwardly directed shoulders adjacent their opposed edges, a coupling member provided with inwardly directed shoulders for engagement with the shoulders on the tire-supporting members, and cam members mounted on the coupling member and operable to engage the opposed edges of the tire-supporting members and force the shoulders carried thereby into interlocking engagement with the shoulders on the coupling member.

2. In a demountable rim for vehicle wheels, a pair of complementary annular tire-supporting members in edge-to-edge relation and provided with outwardly directed shoulders extending along their opposed edges, an annular coupling member having inwardly directed shoulders for engagement with the shoulders on the tire-supporting members, rotatable cam members carried by the coupling member for forcing the tire-supporting members apart to bring about an interlocking relation of the shoulders, and means whereby the cam members may be operated from the inner periphery of the coupling member.

3. In a demountable rim for vehicle wheels, a pair of complementary annular tire-supporting members in edge-to-edge relation and provided with outwardly directed shoulders extending along their opposed edges, a split-ring coupling member having inwardly directed shoulders for engagement with the shoulders on the tire-supporting members, rotatable cam members journaled in the coupling member, said cam members being provided with keyways to receive a key inserted from the inner periphery of the coupling member and said cam members being formed to force apart the inner edges of the tire-supporting members and having flat faces adapted to bear against the edges when the tire-supporting members are in spread and interlocked relation.

4. In a demountable rim for vehicle wheels, a pair of complementary annular tire-supporting members in edge-to-edge relation and provided with outwardly directed shoulders adjacent their opposed edges, a coupling member provided with inwardly directed shoulders for engagement with the shoulders on the tire-supporting members, and means movably mounted on the coupling member between said opposed edges and operable to engage the opposed edges of the tire-supporting members and force the shoulders carried thereby into interlocking engagement with the shoulders on the coupling member.

In testimony whereof I affix my signature.

ZENO LITTMAN.